United States Patent
Hagiwara

(10) Patent No.: US 8,218,246 B2
(45) Date of Patent: Jul. 10, 2012

(54) ZOOM LENS AND IMAGE PICKUP APPARATUS

(75) Inventor: Yasuaki Hagiwara, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 70 days.

(21) Appl. No.: 12/753,455

(22) Filed: Apr. 2, 2010

(65) Prior Publication Data

US 2010/0254024 A1 Oct. 7, 2010

(30) Foreign Application Priority Data

Apr. 2, 2009 (JP) ................................. 2009-089942

(51) Int. Cl.
*G02B 15/14* (2006.01)
(52) U.S. Cl. ...................................................... 359/687
(58) Field of Classification Search .................. 359/687, 359/774, 776
See application file for complete search history.

(56) References Cited

U.S. PATENT DOCUMENTS

| 5,963,378 A | 10/1999 | Tochigi et al. |
| 6,166,864 A | 12/2000 | Horiuchi |
| 7,193,787 B2 | 3/2007 | Horiuchi |
| 7,212,350 B2 * | 5/2007 | Ori ................................. 359/687 |
| 7,466,496 B2 | 12/2008 | Hoshi |
| 2008/0043344 A1 | 2/2008 | Ohtake |
| 2011/0085250 A1 * | 4/2011 | Hagiwara ..................... 359/687 |

FOREIGN PATENT DOCUMENTS

| JP | 7-270684 A | 10/1995 |
| JP | 11-305124 A | 11/1999 |
| JP | 2005-215518 A | 8/2005 |
| JP | 2006-243355 A | 9/2006 |
| JP | 2007-322635 A | 12/2007 |

* cited by examiner

*Primary Examiner* — Joseph P Martinez
(74) *Attorney, Agent, or Firm* — Rossi, Kimms & McDowell LLP

(57) ABSTRACT

The zoom lens with a wide angle of view, a high zoom ratio and high optical performance includes, in order from an object side to an image side, a first lens unit having a positive refractive power, a second lens unit having a negative refractive power, a third lens unit having a positive refractive power, and a fourth lens unit having a positive refractive power. The second and fourth lens units are moved on an optical axis for zooming. The second lens unit is constituted by, in order from the object side to the image side, three negative lens elements and one positive lens element. The zoom lens satisfies $0.54 < |f2|/\sqrt{(fw \cdot ft)} < 0.66$, where f2 represents a focal length of the second lens unit, fw and ft represent focal lengths of the entire zoom lens at a wide-angle end and at a telephoto end, respectively.

6 Claims, 13 Drawing Sheets

ZOOM LENS AND IMAGE PICKUP APPARATUS

BACKGROUND OF THE INVENTION

1. Field of the Invention

The present invention relates to a zoom lens and an image pickup apparatus with the same such as a video camera, a still film/digital camera, a TV camera and a monitoring camera.

2. Related Background Art

Image pickup apparatuses such as video cameras and digital still cameras require, as an image taking optical system, a zoom lens having a wide angle of view, a high zoom ratio and high optical performance.

In general, a high zoom ratio is obtained by increasing a refractive power of a magnification-varying lens unit or increasing a movement amount thereof for zooming. However, such increase of the refractive power and the movement amount of the magnification-varying lens unit increases aberration variation in zooming, which makes it difficult to obtain high optical performance over the entire zoom range.

Therefore, in order to obtain high optical performance of a zoom lens with a wide angle of view over the entire zoom range while realizing a high zoom ratio, it is important to appropriately set a zoom type, a refractive power of each lens unit and a lens configuration.

Zoom lenses are known each of which is constituted by four lens units having positive, negative, positive and positive refractive powers in order from an object side to an image side (image plane side). In such zoom lenses, a zoom lens is also known in which the second lens unit of the four lens units is moved to perform variation of magnification and the fourth lens unit thereof is moved to correct variation of an image plane caused by the variation of magnification and to perform focusing (U.S. Pat. Nos. 5,963,378, 6,166,864 and 7,193,787).

Moreover, as one of the above four-lens-unit zoom lenses, a zoom lens is known which has a high zoom ratio of about 20 times (U.S. Patent Publication No. 2008/0043344 and U.S. Pat. No. 7,466,496).

For these four-lens-unit zoom lenses, it is especially important that a configuration of the second lens unit which is a main lens unit for variation of magnification is appropriately set. For example, inappropriate setting of the refractive power, lens configuration and lens material of the second lens unit makes it difficult to obtain a wide angle of view, a high zoom ratio and high optical performance over the entire zoom range.

SUMMARY OF THE INVENTION

The present invention provides a zoom lens capable of achieving a wide angle of view, a high zoom ratio and high optical performance over the entire zoom range.

The present invention provides as one aspect thereof a zoom lens including, in order from an object side to an image side, a first lens unit having a positive refractive power, a second lens unit having a negative refractive power, a third lens unit having a positive refractive power, and a fourth lens unit having a positive refractive power. The second and fourth lens units are moved on an optical axis for zooming. The second lens unit is constituted by, in order from the object side to the image side, three negative lens elements and one positive lens element. The zoom lens satisfies the following condition:

$$0.54 < |f2|/\sqrt{(fw \cdot ft)} < 0.66$$

where f2 represents a focal length of the second lens unit, fw represents a focal length of the entire zoom lens at a wide-angle end, and ft represents a focal length of the entire zoom lens at a telephoto end.

The present invention provides as another aspect thereof an image pickup apparatus including the above-described zoom lens, and an image pickup element configured to photoelectrically convert an optical image formed by the zoom lens.

Other aspects of the present invention will become apparent from the following description and the attached drawings.

DESCRIPTION OF THE PREFERRED EMBODIMENTS

Exemplary embodiments of the present invention will hereinafter be described with reference to the accompanying drawings.

A zoom lens of each of the below-described embodiments of the present invention includes, in order from an object side to an image side (also referred to as "image plane side"), a first lens unit having a positive refractive power, a second lens unit having a negative refractive power, a third lens unit having a positive refractive power, and a fourth lens unit having a positive refractive power. The second and fourth lens units are moved on an optical axis for zooming.

Figure 1:
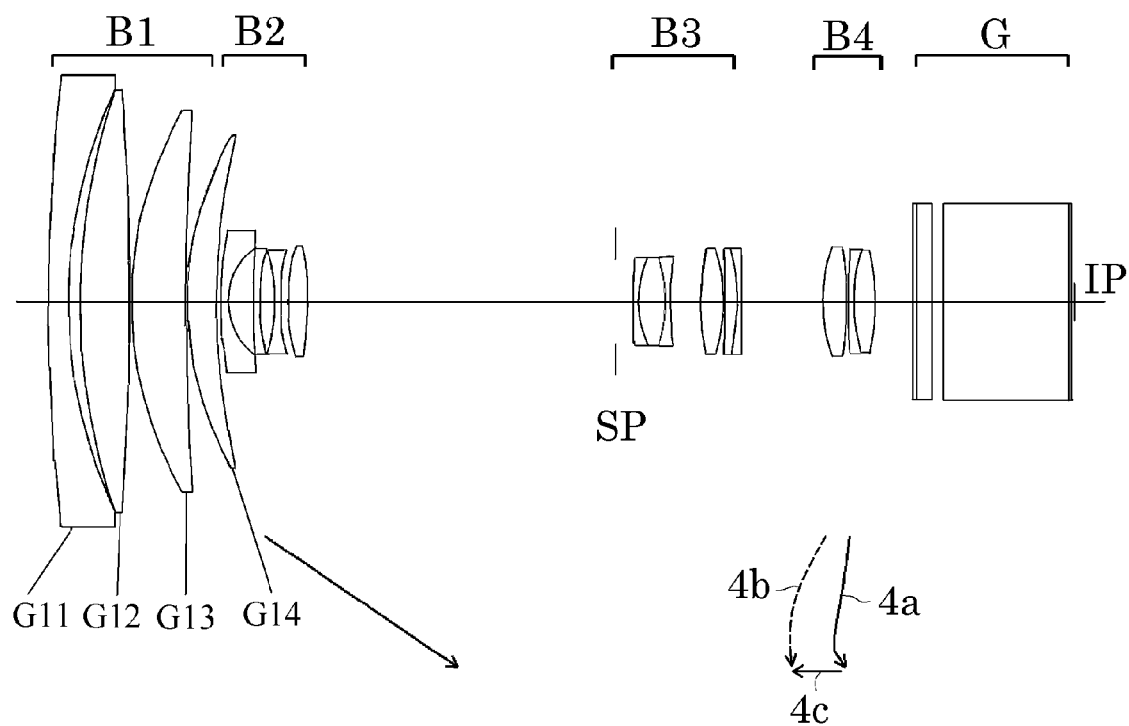
FIG. 1 is a cross-sectional view of a zoom lens that is Embodiment 1 of the present invention at a wide-angle end.
Figure 2:
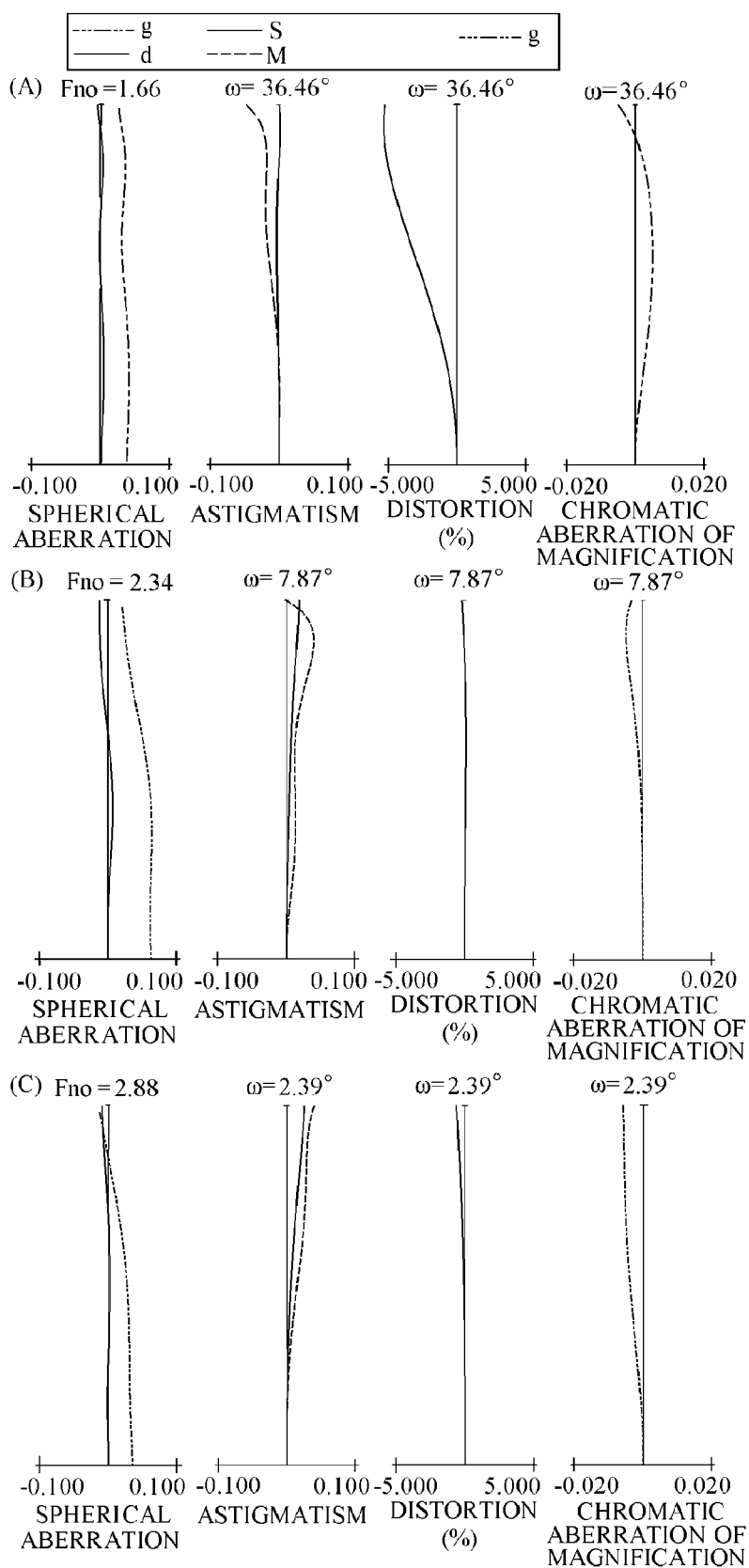
FIG. 2 shows aberration charts of the zoom lens of Embodiment 1.

FIG. 1 is a cross-sectional view of the zoom lens of a first embodiment (Embodiment 1) at a wide-angle end (short focal length end). FIG. 2 shows aberration charts of the zoom lens of Embodiment 1 at the wide-angle end (A), at a middle zoom position (B) and at a telephoto end (long focal length end) (C) when the zoom lens is in focus on an infinitely distant object.

Figure 3:
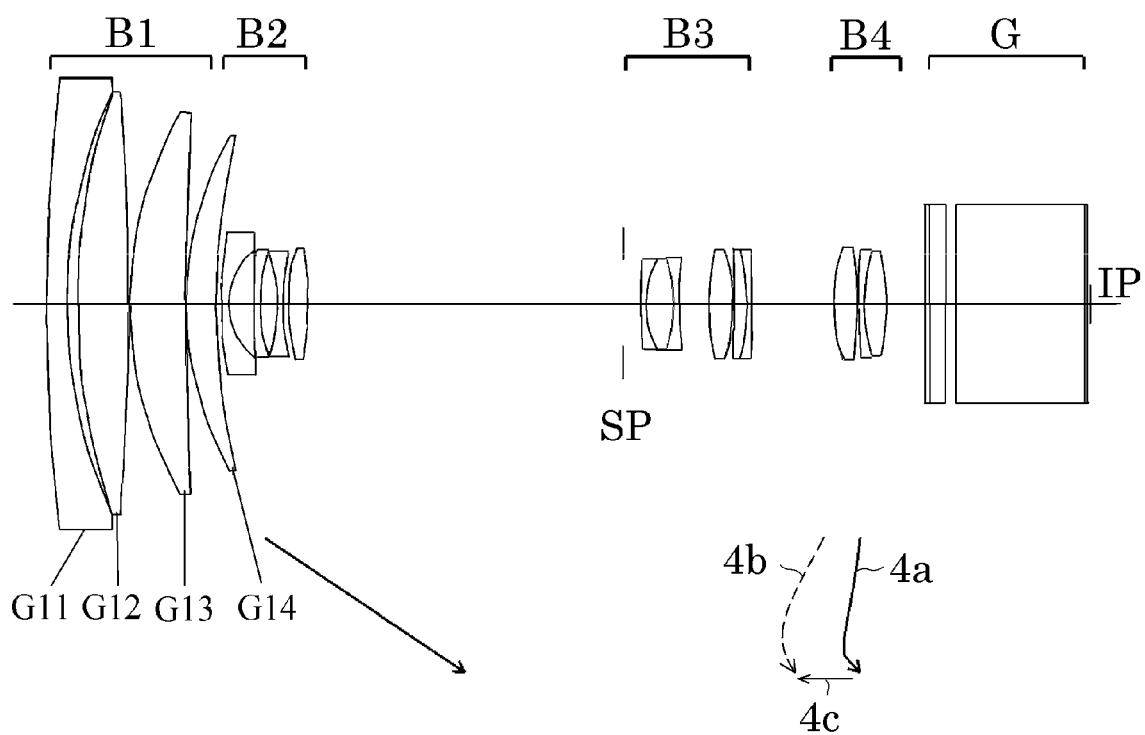
FIG. 3 is a cross-sectional view of a zoom lens that is Embodiment 2 of the present invention at a wide-angle end.
Figure 4:
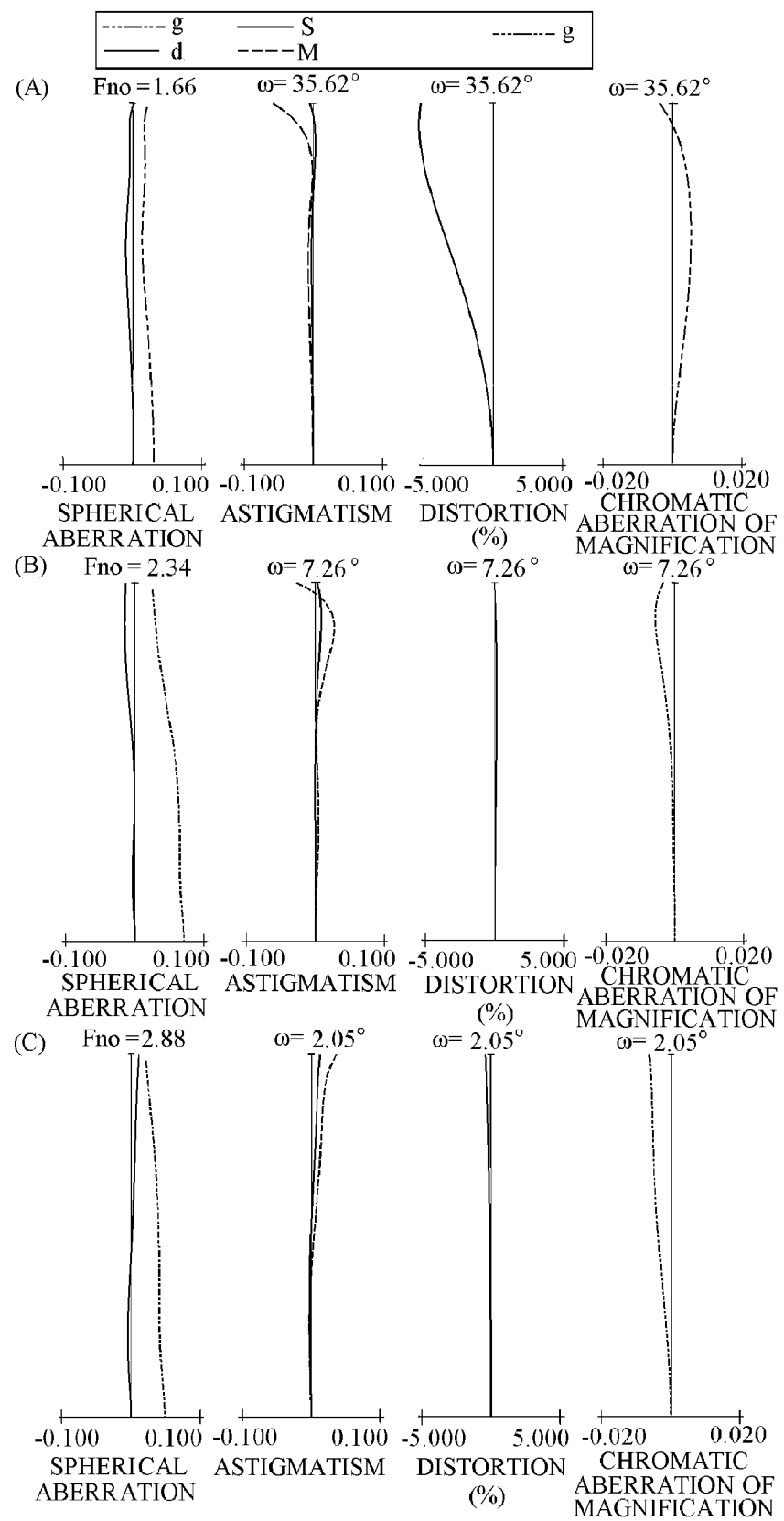
FIG. 4 shows aberration charts of the zoom lens of Embodiment 2.

FIG. 3 is a cross-sectional view of the zoom lens of a second embodiment (Embodiment 2) at a wide-angle end. FIG. 4 shows aberration charts of the zoom lens of Embodiment 2 at the wide-angle end (A), at a middle zoom position (B) and at a telephoto end (C) when the zoom lens is in focus on an infinitely distant object.

Figure 5:
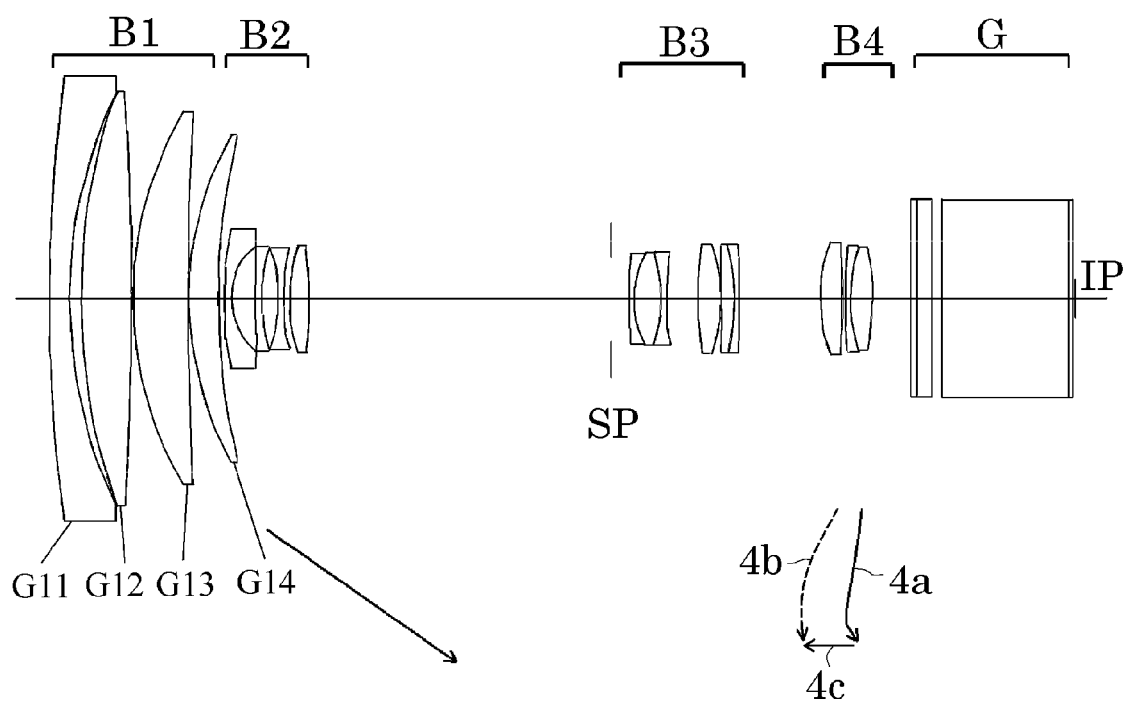
FIG. 5 is a cross-sectional view of a zoom lens that is Embodiment 3 of the present invention at a wide-angle end.
Figure 6:
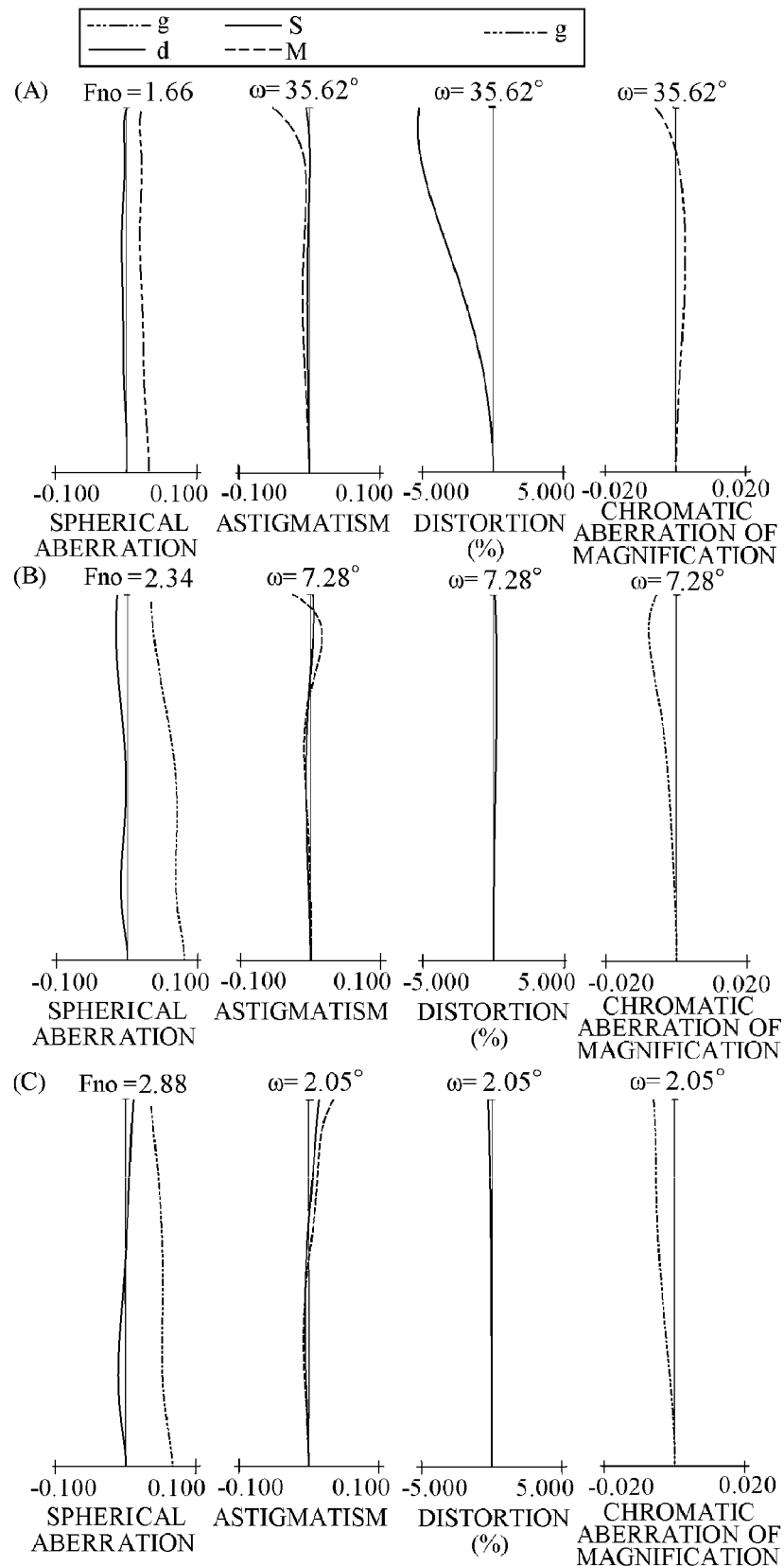
FIG. 6 shows aberration charts of the zoom lens of Embodiment 3.

FIG. 5 is a cross-sectional view of the zoom lens of a third embodiment (Embodiment 3) at a wide-angle end. FIG. 6 shows aberration charts of the zoom lens of Embodiment 3 at the wide-angle end (A), at a middle zoom position (B) and at a telephoto end (C) when the zoom lens is in focus on an infinitely distant object.

Figure 7:
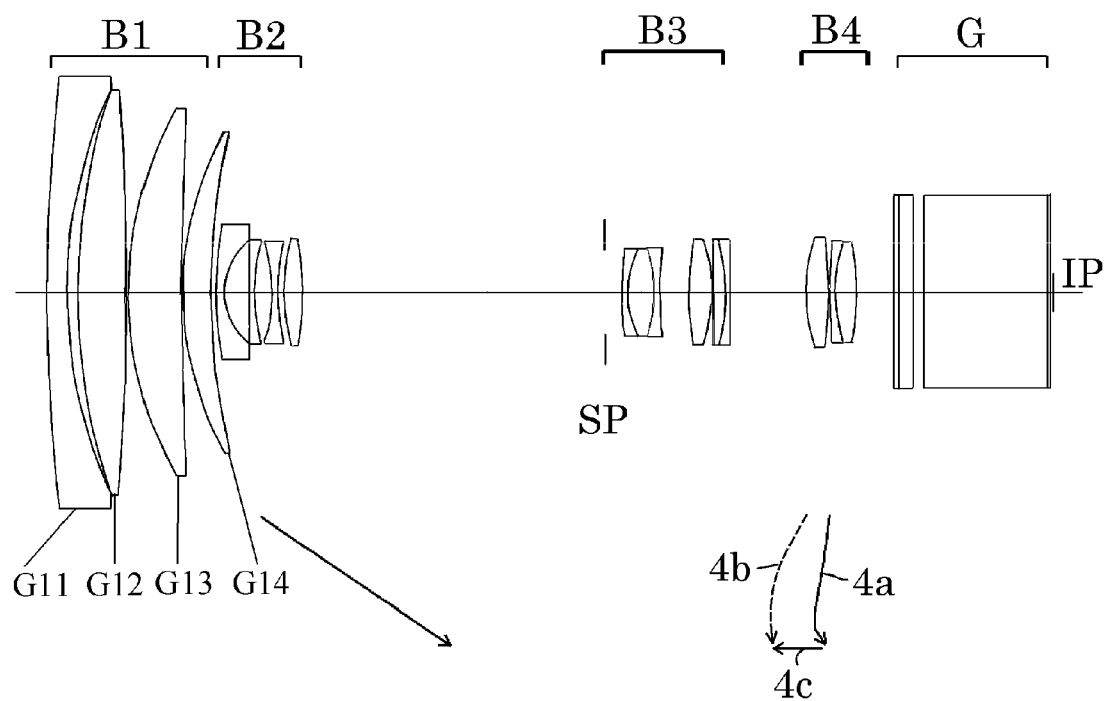
FIG. 7 is a cross-sectional view of a zoom lens that is Embodiment 4 of the present invention at a wide-angle end.
Figure 8:
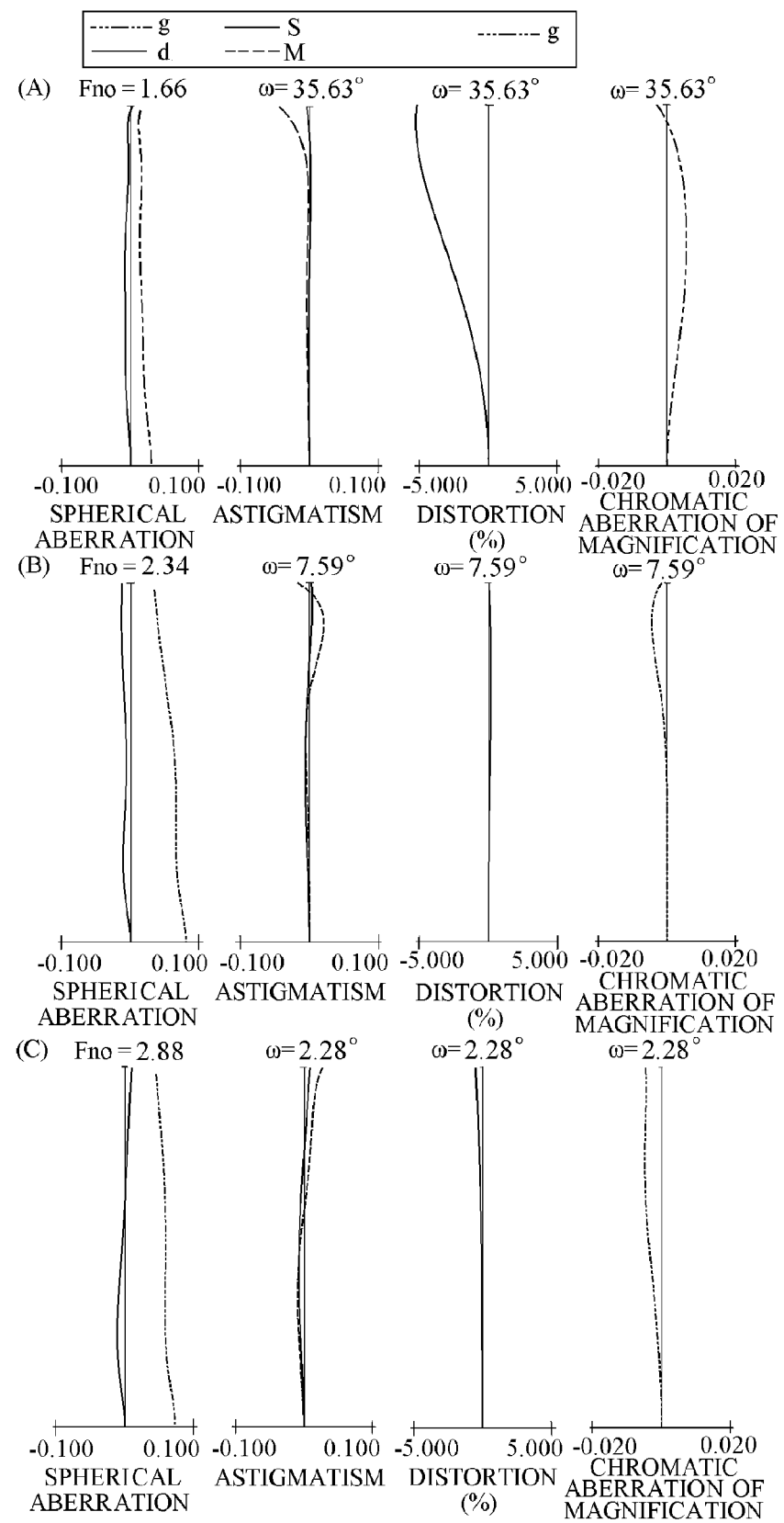
FIG. 8 shows aberration charts of the zoom lens of Embodiment 4.

FIG. 7 is a cross-sectional view of the zoom lens of a fourth embodiment (Embodiment 4) at a wide-angle end. FIG. 8 shows aberration charts of the zoom lens of Embodiment 4 at the wide-angle end (A), at a middle zoom position (B) and at a telephoto end (C) when the zoom lens is in focus on an infinitely distant object.

Figure 9:
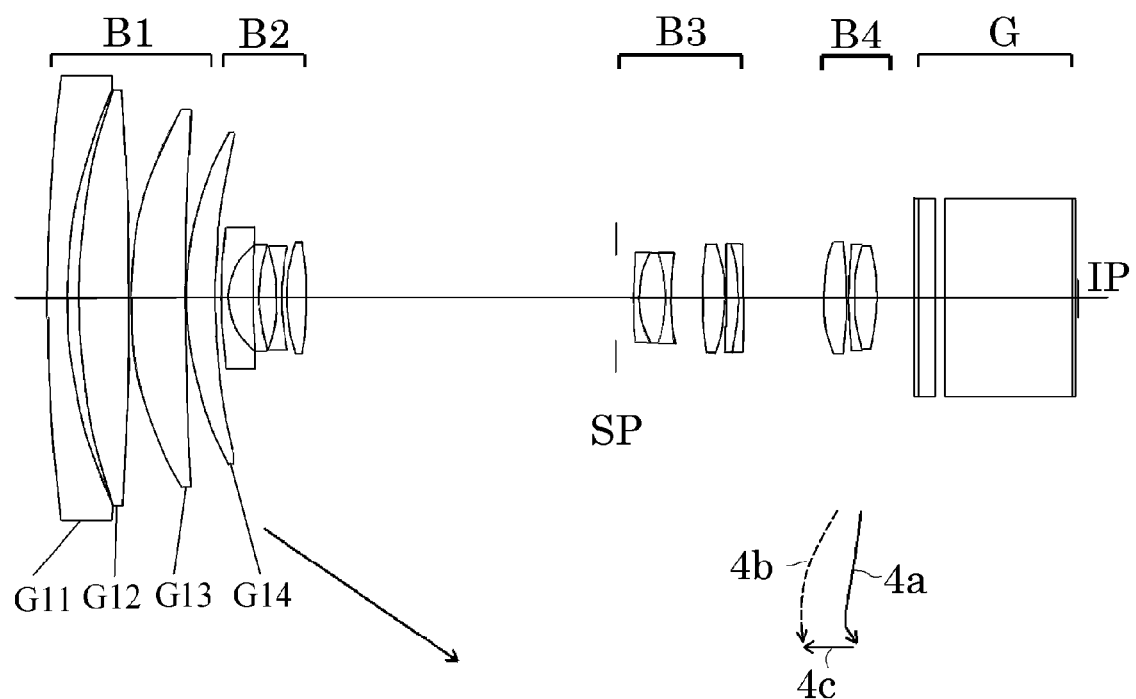
FIG. 9 is a cross-sectional view of a zoom lens that is Embodiment 5 of the present invention at a wide-angle end.
Figure 10:
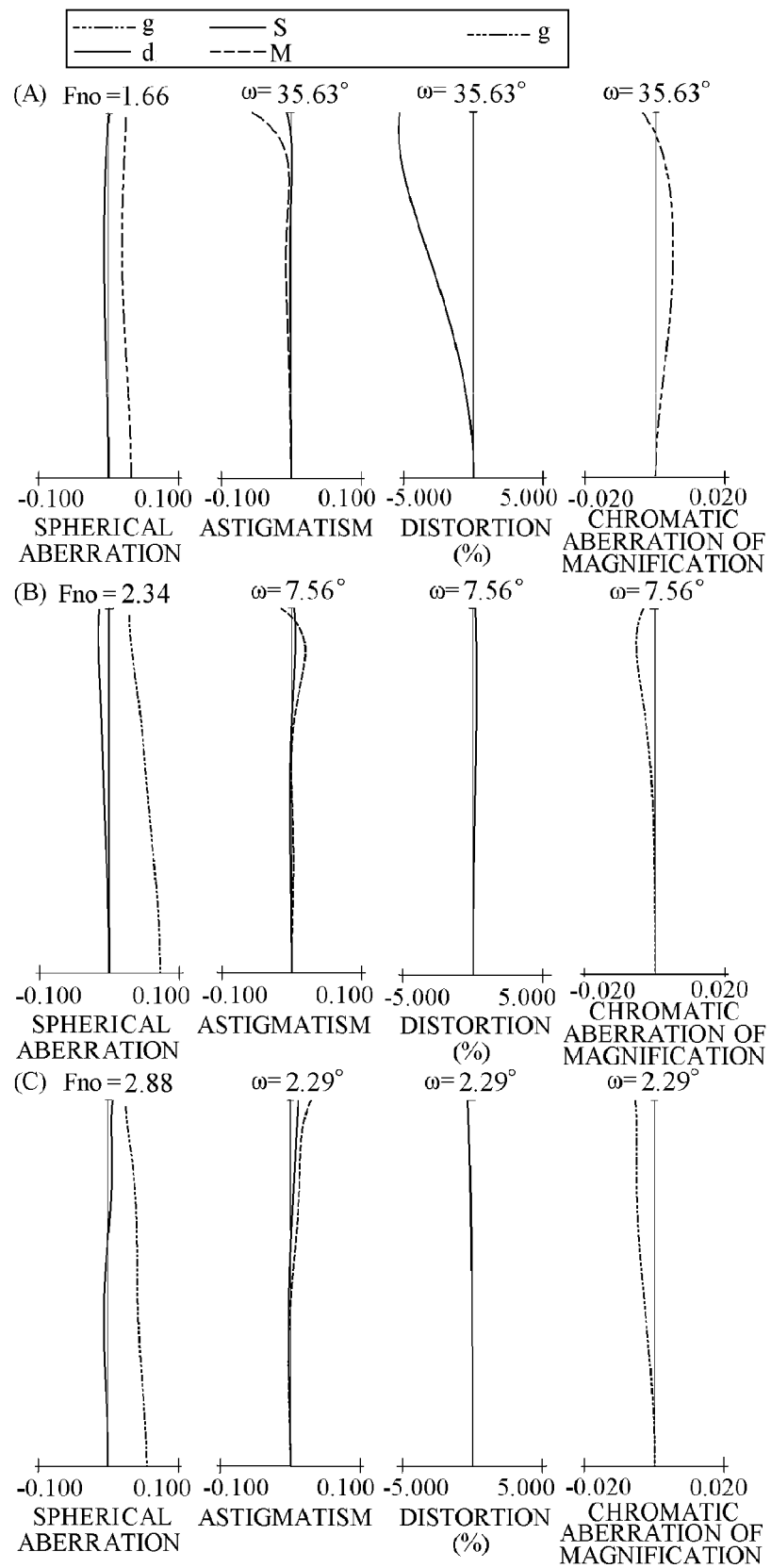
FIG. 10 shows aberration charts of the zoom lens of Embodiment 5.

FIG. 9 is a cross-sectional view of the zoom lens of a fifth embodiment (Embodiment 5) at a wide-angle end. FIG. 10 shows aberration charts of the zoom lens of Embodiment 5 at the wide-angle end (A), at a middle zoom position (B) and at a telephoto end (C) when the zoom lens is in focus on an infinitely distant object.

Figure 11:
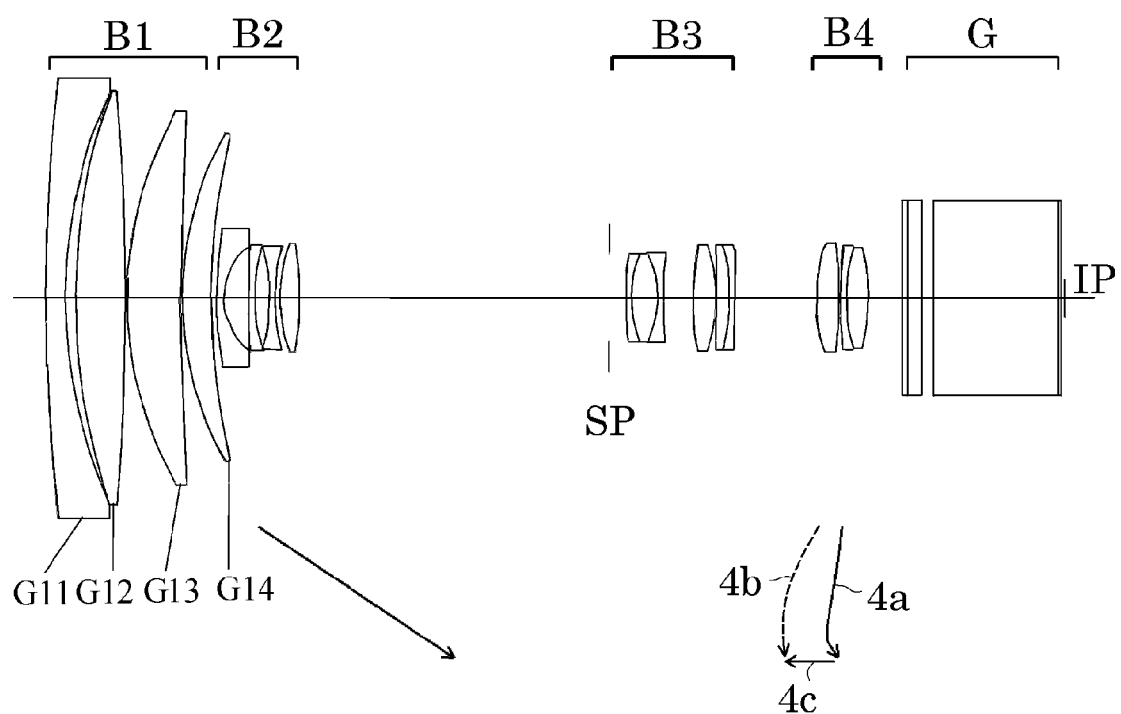
FIG. 11 is a cross-sectional view of a zoom lens that is Embodiment 6 of the present invention at a wide-angle end.
Figure 12:
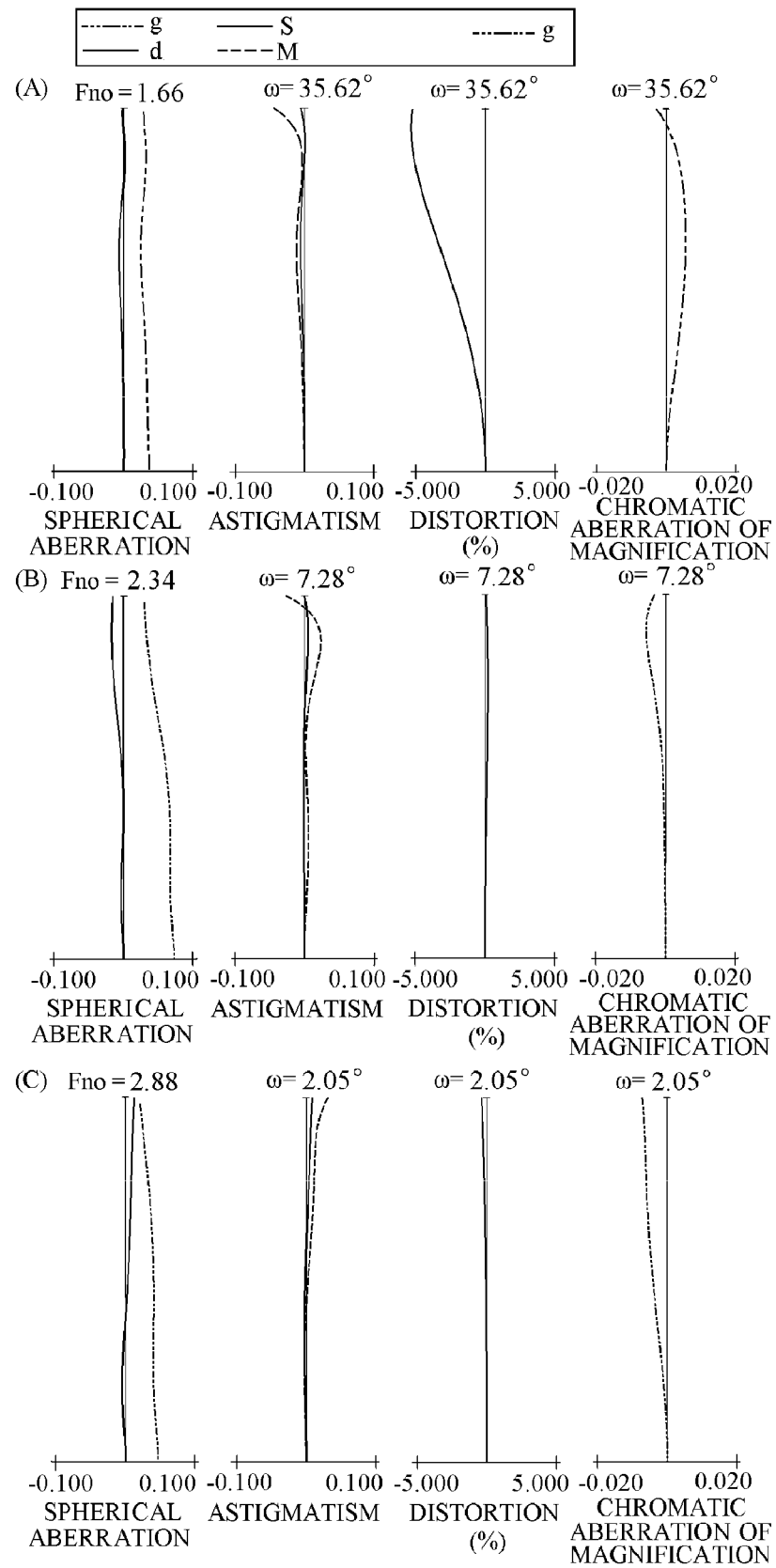
FIG. 12 shows aberration charts of the zoom lens of Embodiment 6.

FIG. 11 is a cross-sectional view of the zoom lens of a sixth embodiment (Embodiment 6) at a wide-angle end. FIG. 12 shows aberration charts of the zoom lens of Embodiment 6 at the wide-angle end (A), at a middle zoom position (B) and at a telephoto end (C) when the zoom lens is in focus on an infinitely distant object.

Figure 13:
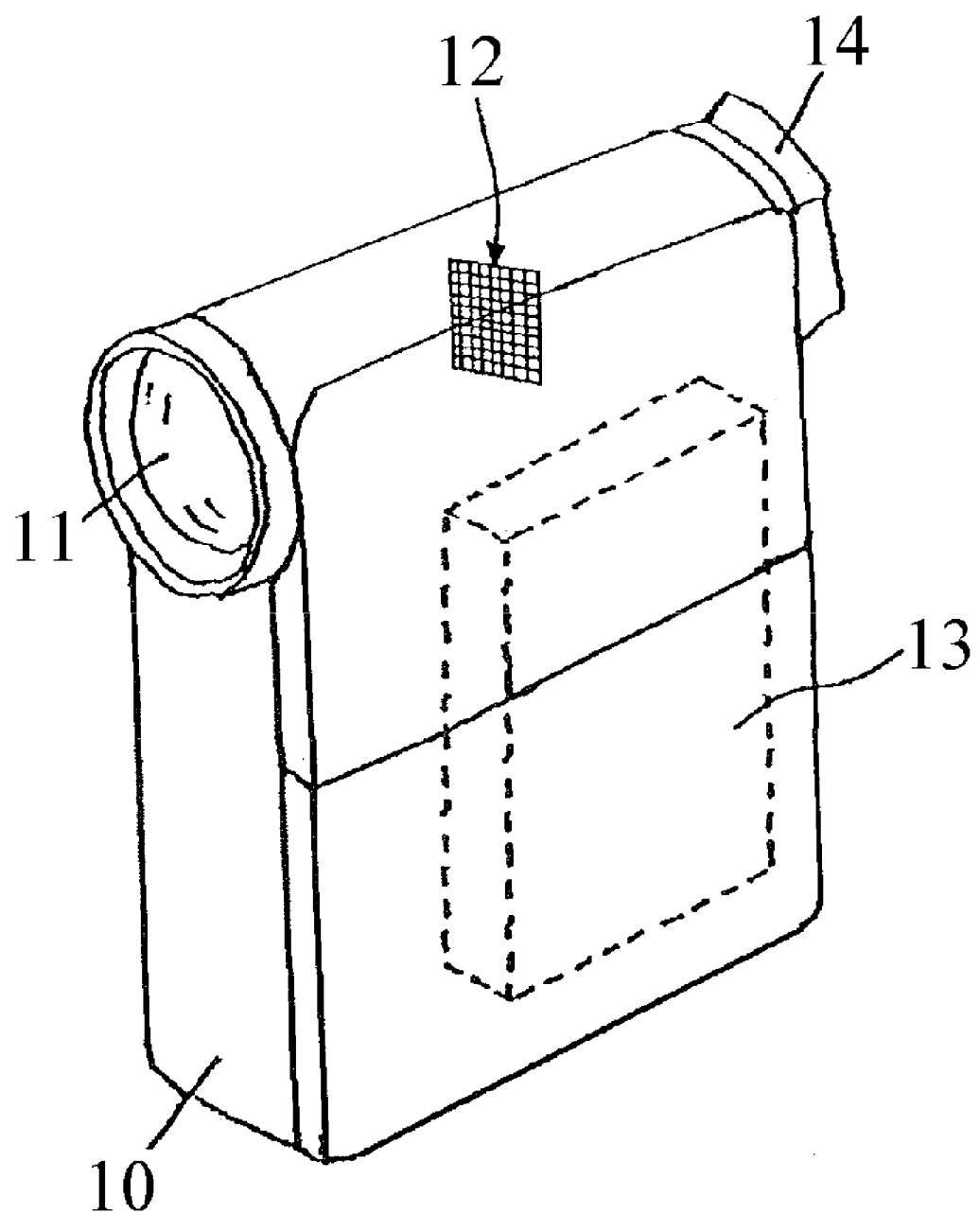
FIG. 13 is a schematic view of an image pickup apparatus provided with the zoom lens of any one of Embodiments 1-6.

FIG. 13 is a schematic view of a video camera (image pickup apparatus) equipped with the zoom lens of any one of Embodiments 1-6.

In each cross-sectional view of the zoom lens, reference character B1 denotes the first lens unit having the positive refractive power ("optical power" means a reciprocal of a focal length), reference character B2 denotes the second lens unit having the negative refractive power, reference character B3 denotes the third lens unit having the positive refractive power, and reference character B4 denotes the fourth lens unit having the positive refractive power. Reference character G denotes an optical block including optical members such as an optical filter and a face plate. The optical block is shown in the below-described numerical examples as a fifth lens unit having no refractive power.

Reference character IP denotes an image plane at which an image pickup surface of a solid-state image pickup element such as a CCD sensor or a CMOS sensor is placed when the zoom lens is used as an image-taking optical system of a video camera or a digital still camera, and at which a film surface is placed when the zoom lens is used as an image-taking optical system of a film camera.

Reference character SP denotes an aperture stop which is disposed closer to an object than the third lens unit B3 (between the second and third lens units B2 and B3).

In each aberration chart of spherical aberration, a solid line shows spherical aberration for d-line, and a chain double-dashed line shows spherical aberration for g-line. In each aberration chart of astigmatic, a dotted line shows astigmatic on a meridional image surface, and a solid line shows astigmatic on a sagittal image surface. Chromatic aberration of magnification is shown by g-line. Reference character Fno denotes an F-number, and reference character ω denotes a half angle of view.

In each embodiment, zoom positions of the wide-angle end and the telephoto end mean positions corresponding to mechanical ends of a movable range of a lens unit for variation of magnification (second lens unit B2 in each Embodiment) on the optical axis.

In each embodiment, for zooming from the zoom position of the wide-angle end to the zoom position of the telephoto end, the second lens unit B2 is moved to the image side to perform the variation of magnification, and variation of the image plane caused by the variation of magnification is corrected by moving the fourth lens unit B4 to the object side along a locus convex toward the object. Moreover, the zoom lens of each embodiment is a rear-focus type zoom lens in which the fourth lens unit B4 is moved on the optical axis to perform focusing.

A solid curved line 4*a* and a dotted curved line 4*b* show movement loci of the fourth lens unit B4 which is moved to correct the variation of the image plane caused by the zooming from the wide-angle end to the telephoto end when the zoom lens is in focus on the infinitely distant object and a near object, respectively. The movement loci (4*a* and 4*b*) of the fourth lens unit B4 convex toward the object enable effective use of a space between the third lens unit B3 and the fourth lens unit B4 to sufficiently reduce the entire length of the zoom lens. The first lens unit B1 and the third lens unit B3 are not moved for zooming and focusing.

In each embodiment, when performing focusing, for example, from the infinitely distant object to the near object at the telephoto end, the fourth lens unit B4 is moved toward the object as shown by an arrow 4*c*.

In each embodiment, when the entire zoom lens is shaken, at least part of lens elements constituting the third lens units B3 is moved such that its movement direction includes a component orthogonal to the optical axis to shift an image-forming position in a direction orthogonal to the optical axis, thereby correcting image blur.

The zoom lens of each embodiment is constituted by, in order from the object side to the image side, the above-described four lens units having the positive, negative, positive and positive refractive powers to realize a wide angle of view and a high zoom ratio. Further, the zoom lens of each embodiment achieves high optical performance by moving the second lens unit B2 and the fourth lens unit B4 for zooming from the wide-angle end to the telephoto end while realizing the high zoom ratio. In particular, increasing the negative refractive power of the second lens unit B2 having the function of variation of magnification makes it possible to perform variation of magnification in a wide zoom range with a small movement amount while realizing a high zoom ratio. The increase of the negative refractive power of the second lens unit B2 makes it difficult to correct aberration generated by the second lens unit B2. However, providing three negative lens elements to the second lens unit B2 so as to appropriately set the refractive power of the second lens unit B2 achieves a high zoom ratio and high optical performance.

Description will hereinafter be made of technical significances of the lens configuration of the second lens unit B2. The second lens unit B2 is constituted by, in order from the object side to the image side, a negative lens element, a negative lens element, a negative lens element and a positive lens element. Increasing the negative refractive power of the second lens unit B2 for realizing a high zoom ratio increases a Petzval sum in a negative direction, which increases field curvature. Moreover, the increase of the negative refractive power of the second lens unit B2 varies comatic aberration and astigmatism greatly in zooming from the wide-angle end to the telephoto end, which makes it difficult to perform aberration correction. Therefore, each embodiment provides the three negative lens elements to the second lens unit B2 to reduce a shared negative refractive power of each of the three negative lens elements, thereby decreasing the Petzval sum.

Furthermore, disposing the three lens elements on the object side (closer to the object than the positive lens element) in the second lens unit B2 brings a principal point of the second lens unit B2 closer to the object to shorten a distance between the principal points of the first lens unit B1 and the second lens unit B2. This makes it possible to bring the first lens unit B1 closer to the aperture stop SP, which reduces a height from the optical axis where an off-axis light flux passes through the first lens unit B1. As a result, each embodiment miniaturizes the first lens unit B1 while realizing a wide angle of view.

Providing at least one aspheric surface to the second lens unit B2 makes it easy to correct astigmatism and distortion well.

In each embodiment, the first lens unit B1 is constituted by, in order from the object side to the image side, a negative lens element, a positive lens element, a positive lens element and a positive lens element. Specifically, the first lens unit B1 is constituted by, in order from the object side to the image side, a negative lens element G11, a positive lens element G12 having a biconvex shape, a positive lens element G13 having an object side convex surface and a positive lens element G14 having a meniscus shape including an object side convex surface.

As described above, in each embodiment, at least part of the third lens unit B3 is moved such that its movement direction includes the component orthogonal to the optical axis to shift the image-forming position in the direction orthogonal to the optical axis, thereby correcting image blur caused by shaking of the zoom lens (that is, shaking of an image pickup apparatus equipped with the zoom lens). Since the third lens unit B3 is not moved with respect to the image plane during zooming, it is easy to dispose a mechanism which drives at least part of the third lens unit B3 such that its movement direction includes the component orthogonal to the optical axis.

An axial light flux passes through a high position in the third lens unit B3 especially at the wide-angle end, which generates large spherical aberration and large comatic aberration. Thus, providing at least one aspheric surface to the third lens unit B3 enables effective correction of the spherical aberration and comatic aberration.

The off-axis light flux passes through a high position in the third lens unit B3 at a middle zoom range, which generates large astigmatism and large field curvature. Thus, providing at least one aspheric surface to the third lens unit B3 enables effective correction of the astigmatism and field curvature. Further, providing a lens element whose both surfaces have aspheric shapes to the third lens unit B3 makes it easy to correct the aberrations generated at the wide-angle end and the middle zoom range, without increasing the number of aspheric lens elements.

The fourth lens unit B4 is constituted by, in order from the object side to the image side, a positive lens element and a cemented lens element in which a negative lens element and a positive lens element are cemented. Moreover, the fourth lens unit B4 that is moved for focusing includes at least one aspheric surface, which enables good correction of variation of aberration caused by the focusing.

The off-axis light flux passes through a high position in the fourth lens unit B4 at the telephoto end, which generates large astigmatism and large field curvature. Thus, providing at least one aspheric surface to the fourth lens unit B4 enables effective correction of the astigmatism and field curvature. Further, providing a lens element whose both surfaces have aspheric shapes to the fourth lens unit B4 makes it easy to correct the above-mentioned variation of aberration caused by the focusing and the aberrations generated at the telephoto end, without increasing the number of aspheric lens elements.

In particular, the fourth lens unit B4 includes the positive lens element on the object side and the cemented lens element in which the negative lens element and the positive lens element are cemented on the image side. Specifically, the fourth lens unit B4 includes, in order from the object side to the image side, a positive lens element having a biconvex shape, and a cemented lens element in which a negative lens element having a meniscus shape including an image side concave surface and a positive lens element having an object side convex surface are cemented. This configuration enables reduction of the variation of aberration caused by the focusing. The zoom lens of each embodiment satisfies the following condition (1):

$$0.54 < |f2|/\sqrt{(fw \cdot ft)} < 0.66 \quad (1)$$

where f2 represents a focal length of the second lens unit B2, fw represents a focal length of the entire zoom lens at the wide-angle end, and ft represents a focal length of the entire zoom lens at the telephoto end.

The condition (1) relates to the refractive power of the second lens unit B2. If a value of $|f2|/\sqrt{(fw \cdot ft)}$ is lower than the lower limit of the condition (1), image plane variation and chromatic aberration of magnification are increased over the entire zoom range, which makes it difficult to obtain high optical performance. If the value of $|f2|/\sqrt{(fw \cdot ft)}$ is higher than the upper limit of the condition (1), a movement amount of the second lens unit B2 during the zooming is increased, which makes it difficult to miniaturize the zoom lens. In order to further reduce the image plane variation caused by the zooming while achieving a high zoom ratio, it is preferable to satisfy the following condition (1a):

$$0.545 < |f2|/\sqrt{(fw \cdot ft)} < 0.650 \quad (1a).$$

The above-described configuration enables provision of a zoom lens having a wide angle of view, a high zoom ratio, and high optical performance over the entire zoom range.

It is more preferable for the zoom lens of each embodiment to satisfy one or more of the following conditions (2)-(6) where N2N represents a refractive index of a material of one of the three negative lens elements in the second lens unit B2, ν2P represents an Abbe constant of a material of the one positive lens element in the second lens unit B2, f1 represents a focal length of the first lens unit B1, and ν1A and ν1B respectively represent Abbe constants of materials of one and another of the positive lens elements in the first lens unit B1:

$$1.85 < N2N \quad (2);$$

$$\nu 2P < 22 \quad (3);$$

$$0.7 \leq f1/ft < 1.0 \quad (4);$$

$$65 < \nu 1A < 75 \quad (5); \text{ and}$$

$$70 < \nu 1B \quad (6).$$

The condition (2) relates to the refractive index of the material of the negative lens element constituting part of the second lens unit B2. If a value of N2N is lower than the lower limit of the condition (2), it is necessary for obtaining a required refractive power to shorten a curvature radius of the negative lens element, which increases a volume of the negative lens element including that of its peripheral portion, thereby increasing a weight of the negative lens element. Such increase of the weight of the negative lens element (that is, the weight of the second lens unit B2) reduces following capability to zooming operations and deteriorates zooming operation feeling.

It is more preferable for decreasing the weight of the negative lens element of the second lens unit B2 to satisfy the following condition (2a) where N21 represents a refractive index of one negative lens element disposed closest to the object (most-object-side negative lens element) in the second lens unit B2:

$$1.95 < N21 \quad (2a)$$

The satisfaction of the condition (2a) enables increase of the curvature radius of the most-object-side negative lens element having a largest volume among the lens elements constituting the second lens unit B2, which makes it easy to reduce the volume of the most-object-side negative lens element and decrease its weight.

The condition (3) relates to the Abbe constant of the material forming the positive lens element constituting part of the second lens unit B2. If a value of v2P is higher than the upper limit of the condition (3), chromatic aberration of magnification is increased at the wide-angle end and longitudinal chromatic aberration is increased at the telephoto end, which makes it difficult to achieve high optical performance. It is more preferable for reducing the chromatic aberration of magnification at the wide-angle end and the longitudinal chromatic aberration at the telephoto end to satisfy the following condition (3a):

$$v2P < 21 \quad (3a)$$

In order to realize a high zoom ratio while maintaining high optical performance, it is preferable that the first lens unit B1 be constituted by four lens elements including a negative lens element, a positive lens element, a positive lens element and a positive lens element. In this case, it is preferable that the focal length f1 of the first lens unit B1 satisfy the condition (4).

The condition (4) limits a preferable range of the refractive power of the first lens unit B1 with respect to the focal length of the entire zoom lens at the telephoto end. If a value of f1/ft is lower than the lower limit of the condition (4), the refractive power of the first lens unit B1 becomes too large, which generates large field curvature and large astigmatism. In order to correct these aberrations well, it is necessary to increase the number of the lens elements constituting the first lens unit B1 or add an aspheric surface to the first lens unit B1. Conversely, if the value of f1/ft is higher than the upper limit of the condition (4), though aberration correction can be performed well, an effective diameter of the first lens unit B1 becomes large, which is undesirable.

It is more preferable to satisfy the following condition:

$$0.75 < f1/ft < 9.5 \quad (4a)$$

The conditions (5) and (6) relate to the Abbe constants of the materials of any two of the positive lens elements included in the first lens unit B1. If a value of v1A or v1B is lower than the lower limit of corresponding one of the conditions (5) and (6), it is difficult to well correct chromatic aberration of magnification and longitudinal chromatic aberration at the telephoto end. If a low dispersion glass material whose v1A or v1B is higher than the lower limit of the corresponding one of the conditions (5) and (6), a refractive index of the positive lens element becomes low, which makes it difficult to correct spherical aberration.

It is more preferable to satisfy the following conditions (5a) and (6a):

$$67 < v1A < 72 \quad (5a)$$

$$70.1 < v1B \quad (6a)$$

It is still further preferable to satisfy the following condition (6b) in addition to satisfying the condition (6a):

$$80 < v1B \quad (6b)$$

Each embodiment has the above-described configuration to achieve a zoom lens with high optical performance while obtaining a wide angle of view 2ω of 71.2-73 degrees at the wide-angle end and a high zoom ratio of 18-20 times. Each embodiment may additionally include a lens unit having a small refractive power at a position closer to the object than the first lens unit B1 or at a position closer to the image plane than the fourth lens unit B4. Moreover, each embodiment may additionally include another lens unit such as a teleconverter lens and a wide converter lens at an object side position or at an image side position.

Numerical Examples 1-6 respectively corresponding to Embodiments 1-6 will be shown below. In each of Numerical Examples, i denotes an order of a surface or an optical member counted from the object side, ri denotes a curvature radius of an i-th surface, di denotes a distance between the i-th surface and a (i+1)-th surface, ndi and vdi respectively denote a refractive index and an Abbe constant of a material of an i-th optical member for d-line.

In Numerical Examples 1-6, six surfaces closest to the image plane are planes of the optical block G.

The aspheric surface shape is expressed by the following expression where X represents a displacement amount of an apex of the aspheric surface in a direction of the optical axis at a position whose height from the optical axis is H, a positive direction represents a direction in which light progresses, R represents a paraxial curvature radius, k represents a conic constant, and A3 to A13 represent aspheric surface coefficients:

$$X = \frac{\frac{H^2}{R}}{1 + \sqrt{1 - (1+k)\left(\frac{H}{R}\right)^2}} + A3H^3 + A4H^4 + A5H^5 + A6H^6 +$$

$$A7H^7 + A8H^8 + A9H^9 + A10H^{10} + A11H^{11} + A12H^{12} + A13H^{13}$$

In each of Numerical Examples 1-6, the aspheric surface coefficient (A3-A13) not described in a column of "ASPHERIC SURFACE DATA" is zero. A surface with an asterisk "*" has an aspheric surface shape. "e-x" means "×10⁻ˣ". BF represents a back focus. Moreover, relationships between the above-mentioned conditions and Numerical Examples 1-6 are shown in TABLE 1.

Numerical Example 1

| Unit mm | | | | |
|---|---|---|---|---|
| SURFACE DATA | | | | |
| SURFACE NUMBER | r | d | nd | vd |
| 1 | 318.471 | 3.20 | 1.84666 | 23.9 |
| 2 | 79.665 | 1.88 | | |
| 3 | 105.168 | 7.87 | 1.59319 | 67.9 |
| 4 | −443.202 | 0.20 | | |
| 5 | 60.442 | 8.61 | 1.49700 | 81.5 |
| 6 | 457.728 | 0.20 | | |
| 7 | 52.824 | 4.55 | 1.83481 | 42.7 |
| 8 | 112.737 | (VARIABLE) | | |
| 9 | 65.502 | 1.15 | 2.00069 | 25.5 |
| 10 | 10.807 | 3.90 | | |
| 11 | 105.788 | 1.00 | 1.86400 | 40.6 |
| 12* | 31.349 | 2.41 | | |

-continued

Unit mm

| 13 | −26.972 | 0.85 | 1.77250 | 49.6 |
| 14 | 35.658 | 1.19 | | |
| 15 | 31.147 | 3.10 | 1.94595 | 18.0 |
| 16 | −55.157 | (VARIABLE) | | |
| 17 (APERTURE STOP) | ∞ | 2.73 | | |
| 18 | 94.677 | 0.80 | 1.88300 | 40.8 |
| 19 | 15.502 | 4.20 | 1.84666 | 23.9 |
| 20 | −25.424 | 0.14 | | |
| 21 | −22.315 | 0.80 | 2.00330 | 28.3 |
| 22 | 65.817 | 4.75 | | |
| 23* | 47.103 | 3.60 | 1.58313 | 59.4 |
| 24* | −26.350 | 0.20 | | |
| 25 | −204.574 | 2.00 | 1.48749 | 70.2 |
| 26 | −34.181 | 0.80 | 1.80518 | 25.4 |
| 27 | −236.092 | (VARIABLE) | | |
| 28* | 30.446 | 3.60 | 1.58313 | 59.4 |
| 29* | −47.912 | 0.20 | | |
| 30 | 89.803 | 0.90 | 1.92286 | 18.9 |
| 31 | 29.082 | 3.50 | 1.51633 | 64.1 |
| 32 | −37.022 | (VARIABLE) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| IMAGE PLANE | ∞ | | | |

ASPHERIC SURFACE DATA

12th SURFACE $k = -1.50514e+001$  $A4 = 6.00285e-005$
$A6 = -1.50604e-007$  $A8 = -1.01899e-009$
$A10 = 2.69112e-011$  $A12 = 4.79984e-014$

23rd SURFACE $k = 6.02208e+000$  $A3 = 1.77478e-005$
$A5 = -2.17672e-006$  $A7 = -5.57323e-009$
$A9 = 2.05066e-010$  $A11 = -1.17497e-012$

24th SURFACE $k = -4.79881e+000$  $A3 = 5.67317e-006$
$A5 = -3.80459e-006$  $A7 = 2.38819e-008$
$A9 = -8.23521e-011$

28th SURFACE $k = 6.00573e-003$  $A4 = 1.94847e-005$
$A6 = -2.31853e-007$  $A8 = 1.72707e-009$
$A10 = 2.04797e-011$

29th SURFACE $k = -7.31653e+000$  $A4 = 3.06179e-005$
$A6 = -2.22436e-007$  $A8 = 1.98088e-009$
$A10 = 2.07228e-011$

OTHER DATA
ZOOM RATIO 17.69

| | | | | | | |
|---|---|---|---|---|---|---|
| FOCAL LENGTH | 4.10 | 21.91 | 72.53 | 7.53 | 40.89 | 5.87 |
| F-NUMBER | 1.66 | 2.34 | 2.88 | 1.81 | 2.65 | 1.72 |
| ANGLE OF VIEW | 36.46 | 7.87 | 2.39 | 21.92 | 4.24 | 27.30 |
| IMAGE HEIGHT | 3.03 | 3.03 | 3.03 | 3.03 | 3.03 | 3.03 |
| ENTIRE LENS LENGTH | 153.32 | 153.32 | 153.32 | 153.32 | 153.32 | 153.32 |
| BF | 22.83 | 26.34 | 23.78 | 24.23 | 26.26 | 23.65 |
| d8 | 0.77 | 35.08 | 46.52 | 16.78 | 41.94 | 10.84 |
| d16 | 48.62 | 14.31 | 2.88 | 32.61 | 7.45 | 38.55 |
| d27 | 12.77 | 9.27 | 11.82 | 11.37 | 9.34 | 11.95 |
| d32 | 5.81 | 9.32 | 6.77 | 7.21 | 9.25 | 6.63 |

-continued

Unit mm

DATA OF LENS UNITS

| LENS UNIT | MOST-OBJECT-SIDE SURFACE | FOCAL LENGTH |
|---|---|---|
| 1 | 1 | 66.28 |
| 2 | 9 | −10.96 |
| 3 | 17 | 108.04 |
| 4 | 28 | 25.23 |
| 5 | 33 | ∞ |

Numerical Example 2

Unit mm

SURFACE DATA

| SURFACE NUMBER | r | d | nd | vd |
|---|---|---|---|---|
| 1 | 301.174 | 3.20 | 1.84666 | 23.9 |
| 2 | 80.298 | 1.68 | | |
| 3 | 103.728 | 7.87 | 1.59319 | 67.9 |
| 4 | −426.609 | 0.20 | | |
| 5 | 59.636 | 8.61 | 1.49700 | 81.5 |
| 6 | 453.779 | 0.20 | | |
| 7 | 53.838 | 4.55 | 1.83481 | 42.7 |
| 8 | 109.172 | (VARIABLE) | | |
| 9 | 63.931 | 1.15 | 2.00069 | 25.5 |
| 10 | 10.905 | 3.88 | | |
| 11 | 110.681 | 1.00 | 1.86400 | 40.6 |
| 12* | 30.264 | 2.64 | | |
| 13 | −26.486 | 0.85 | 1.77250 | 49.6 |
| 14 | 39.205 | 0.85 | | |
| 15 | 30.538 | 3.10 | 1.94595 | 18.0 |
| 16 | −55.676 | (VARIABLE) | | |
| 17 (APERTURE STOP) | ∞ | 2.73 | | |
| 18 | 90.027 | 0.80 | 1.88300 | 40.8 |
| 19 | 15.533 | 4.20 | 1.84666 | 23.9 |
| 20 | −25.123 | 0.13 | | |
| 21 | −22.301 | 0.80 | 2.00330 | 28.3 |
| 22 | 65.433 | 4.75 | | |
| 23* | 46.951 | 3.60 | 1.58313 | 59.4 |
| 24* | −26.833 | 0.20 | | |
| 25 | −211.791 | 2.00 | 1.48749 | 70.2 |
| 26 | −34.814 | 0.80 | 1.80518 | 25.4 |
| 27 | −237.687 | (VARIABLE) | | |
| 28* | 30.529 | 3.60 | 1.58313 | 59.4 |
| 29* | −48.824 | 0.20 | | |
| 30 | 90.537 | 0.90 | 1.92286 | 18.9 |
| 31 | 28.913 | 3.50 | 1.51633 | 64.1 |
| 32 | −37.602 | (VARIABLE) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| IMAGE PLANE | ∞ | | | |

ASPHERIC SURFACE DATA

12th SURFACE $k = -1.10481e+001$  $A4 = 5.68929e-005$
$A6 = -9.31431e-008$  $A8 = 1.95577e-009$
$A10 = -4.65699e-012$  $A12 = 5.82349e-014$

23rd SURFACE $k = 4.57308e+000$  $A3 = 2.12129e-005$
$A5 = -2.14454e-006$  $A7 = -3.25410e-009$
$A9 = 1.69980e-010$  $A11 = -9.80470e-013$

-continued

Unit mm

24th SURFACE k = −4.86060e+000    A3 = 4.33522e−006
A5 = −3.73578e−006   A7 = 2.22220e−008
A9 = −7.12145e−011
28th SURFACE k = 9.24307e−003     A4 = 1.95898e−005
A6 = −2.24315e−007   A8 = 1.90519e−009
A10 = 2.03321e−011
29th SURFACE k = −7.30540e+000    A4 = 3.01647e−005
A6 = −2.05498e−007   A8 = 2.01927e−009
A10 = 2.15171e−011

OTHER DATA
ZOOM RATIO 19.97

| | | | | | | |
|---|---|---|---|---|---|---|
| FOCAL LENGTH | 4.23 | 23.76 | 84.42 | 7.87 | 45.67 | 6.10 |
| F-NUMBER | 1.66 | 2.34 | 2.88 | 1.81 | 2.65 | 1.72 |
| ANGLE OF VIEW | 35.62 | 7.26 | 2.05 | 21.05 | 3.79 | 26.42 |
| IMAGE HEIGHT | 3.03 | 3.03 | 3.03 | 3.03 | 3.03 | 3.03 |
| ENTIRE LENS LENGTH | 153.18 | 153.18 | 153.18 | 153.18 | 153.18 | 153.18 |
| BF | 22.99 | 26.73 | 23.00 | 24.49 | 26.44 | 23.87 |
| d8 | 0.84 | 35.65 | 47.26 | 17.09 | 42.62 | 11.05 |
| d16 | 48.81 | 14.00 | 2.39 | 32.57 | 7.04 | 38.60 |
| d27 | 12.54 | 8.80 | 12.53 | 11.04 | 9.09 | 11.66 |
| d32 | 5.97 | 9.71 | 5.98 | 7.47 | 9.42 | 6.85 |

DATA OF LENS UNITS

| LENS UNIT | MOST-OBJECT-SIDE SURFACE | FOCAL LENGTH |
|---|---|---|
| 1 | 1 | 66.86 |
| 2 | 9 | −10.93 |
| 3 | 17 | 102.62 |
| 4 | 28 | 25.61 |
| 5 | 33 | ∞ |

Numerical Example 3

Unit mm

SURFACE DATA

| SURFACE NUMBER | r | d | nd | vd |
|---|---|---|---|---|
| 1 | 257.553 | 3.20 | 1.84666 | 23.9 |
| 2 | 75.460 | 1.80 | | |
| 3 | 98.141 | 7.87 | 1.59319 | 67.9 |
| 4 | −517.013 | 0.20 | | |
| 5 | 57.573 | 8.61 | 1.49700 | 81.5 |
| 6 | 509.292 | 0.20 | | |
| 7 | 53.115 | 4.55 | 1.83481 | 42.7 |
| 8 | 109.311 | (VARIABLE) | | |
| 9 | 61.257 | 1.15 | 2.00069 | 25.5 |
| 10 | 10.982 | 3.73 | | |
| 11 | 130.593 | 1.00 | 1.86400 | 40.6 |
| 12* | 30.364 | 2.63 | | |
| 13 | −25.150 | 0.85 | 1.77250 | 49.6 |
| 14 | 34.876 | 0.93 | | |
| 15 | 29.694 | 3.10 | 1.94595 | 18.0 |
| 16 | −57.648 | (VARIABLE) | | |
| 17 (APERTURE STOP) | ∞ | 2.73 | | |
| 18 | 90.811 | 0.80 | 1.88300 | 40.8 |
| 19 | 16.089 | 4.20 | 1.84666 | 23.9 |
| 20 | −25.134 | 0.14 | | |
| 21 | −22.223 | 0.80 | 2.00330 | 28.3 |
| 22 | 67.969 | 4.75 | | |
| 23* | 45.853 | 3.60 | 1.58313 | 59.4 |
| 24* | −26.791 | 0.20 | | |
| 25 | −256.997 | 2.00 | 1.48749 | 70.2 |
| 26 | −35.306 | 0.80 | 1.80518 | 25.4 |
| 27 | −289.904 | (VARIABLE) | | |
| 28* | 29.980 | 3.60 | 1.58313 | 59.4 |
| 29* | −50.804 | 0.20 | | |
| 30 | 92.305 | 0.90 | 1.92286 | 18.9 |
| 31 | 29.627 | 3.50 | 1.51633 | 64.1 |
| 32 | −38.608 | (VARIABLE) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| IMAGE PLANE | ∞ | | | |

ASPHERIC SURFACE DATA

12th SURFACE k = −1.00626e+001    A4 = 5.60683e−005
A6 = 5.44198e−008    A8 = 1.70480e−009
A10 = 1.47104e−012   A12 = 8.12086e−014
23rd SURFACE k = 2.75906e+000     A3 = 2.12208e−005
A5 = −1.94863e−006   A7 = −2.10172e−009
A9 = 2.24105e−010    A11 = −1.06411e−012
24th SURFACE k = −5.16339e+000    A3 = −5.55811e−006
A5 = −4.10860e−006   A7 = 2.88620e−008
A9 = −5.54895e−011
28th SURFACE k = −1.49495e−001    A4 = 2.25754e−005
A6 = −2.26712e−007   A8 = 2.91457e−009
A10 = 2.14405e−011
29th SURFACE k = −8.07409e+000    A4 = 3.33734e−005
A6 = −2.26516e−007   A8 = 3.29579e−009
A10 = 2.28830e−011

OTHER DATA
ZOOM RATIO 19.99

| | | | | | | |
|---|---|---|---|---|---|---|
| FOCAL LENGTH | 4.23 | 23.70 | 84.49 | 7.86 | 45.58 | 6.09 |
| F-NUMBER | 1.66 | 2.34 | 2.88 | 1.81 | 2.65 | 1.72 |
| ANGLE OF VIEW | 35.62 | 7.28 | 2.05 | 21.08 | 3.80 | 26.44 |
| IMAGE HEIGHT | 3.03 | 3.03 | 3.03 | 3.03 | 3.03 | 3.03 |
| ENTIRE LENS LENGTH | 151.78 | 151.78 | 151.78 | 151.78 | 151.78 | 151.78 |
| BF | 23.03 | 26.93 | 23.18 | 24.59 | 26.68 | 23.94 |
| d8 | 0.86 | 34.22 | 45.34 | 16.43 | 40.90 | 10.65 |
| d16 | 47.18 | 13.82 | 2.70 | 31.61 | 7.15 | 37.39 |
| d27 | 12.67 | 8.76 | 12.52 | 11.11 | 9.02 | 11.75 |
| d32 | 6.01 | 9.91 | 6.16 | 7.57 | 9.66 | 6.92 |

DATA OF LENS UNITS

| LENS UNIT | MOST-OBJECT-SIDE SURFACE | FOCAL LENGTH |
|---|---|---|
| 1 | 1 | 64.59 |
| 2 | 9 | −10.40 |
| 3 | 17 | 96.54 |
| 4 | 28 | 25.80 |
| 5 | 33 | ∞ |

Numerical Example 4

Unit mm

SURFACE DATA

| SURFACE NUMBER | r | d | nd | vd |
|---|---|---|---|---|
| 1 | 291.874 | 3.20 | 1.84666 | 23.9 |
| 2 | 79.033 | 1.76 | | |
| 3 | 103.670 | 7.87 | 1.56907 | 71.3 |
| 4 | −412.090 | 0.20 | | |
| 5 | 60.396 | 8.61 | 1.48749 | 70.2 |
| 6 | 561.360 | 0.20 | | |
| 7 | 52.623 | 4.55 | 1.80400 | 46.6 |
| 8 | 114.825 | (VARIABLE) | | |
| 9 | 69.010 | 1.15 | 2.00330 | 28.3 |
| 10 | 10.931 | 3.98 | | |
| 11 | 183.808 | 1.00 | 1.68540 | 52.3 |
| 12* | 31.930 | 2.77 | | |
| 13 | −26.408 | 0.85 | 1.77250 | 49.6 |
| 14 | 32.238 | 1.04 | | |
| 15 | 30.422 | 3.10 | 1.92286 | 20.9 |
| 16 | −46.949 | (VARIABLE) | | |
| 17 (APERTURE STOP) | ∞ | 2.73 | | |
| 18 | 91.135 | 0.80 | 1.88300 | 40.8 |
| 19 | 14.972 | 4.20 | 1.84666 | 23.9 |
| 20 | −24.965 | 0.13 | | |
| 21 | −22.170 | 0.80 | 2.00330 | 28.3 |
| 22 | 64.950 | 4.75 | | |
| 23* | 47.027 | 3.60 | 1.58313 | 59.4 |
| 24* | −26.551 | 0.20 | | |
| 25 | −272.373 | 2.00 | 1.48749 | 70.2 |
| 26 | −35.000 | 0.80 | 1.80518 | 25.4 |
| 27 | −244.903 | (VARIABLE) | | |
| 28* | 30.954 | 3.60 | 1.58313 | 59.4 |
| 29* | −48.512 | 0.20 | | |
| 30 | 90.035 | 0.90 | 1.92286 | 18.9 |
| 31 | 28.177 | 3.50 | 1.51633 | 64.1 |
| 32 | −37.122 | (VARIABLE) | | |
| 33 | ∞ | 0.80 | 1.52420 | 60.0 |
| 34 | ∞ | 2.43 | 1.54400 | 70.0 |
| 35 | ∞ | 1.50 | | |
| 36 | ∞ | 20.00 | 1.58913 | 61.1 |
| 37 | ∞ | 0.50 | 1.49831 | 65.1 |
| 38 | ∞ | 0.5 | | |
| IMAGE PLANE | ∞ | | | |

ASPHERIC SURFACE DATA

12th SURFACE k = −1.26122e+001  A4 = 4.65958e−005
A6 = −1.16363e−007  A8 = 1.22752e−009
A10 = 3.93733e−012  A12 = 4.06006e−014

23rd SURFACE k = 3.81596e+000  A3 = 1.60154e−005
A5 = −1.98853e−006  A7 = −3.42790e−009
A9 = 1.79254e−010  A11 = −1.01638e−012

24th SURFACE k = −5.12512e+000  A3 = −9.64898e−006
A5 = −3.88306e−006  A7 = 2.43664e−008
A9 = −7.74172e−011

28th SURFACE k = 1.80601e−001  A4 = 2.10564e−005
A6 = −2.25859e−007  A8 = 2.18844e−009
A10 = 1.83482e−011

29th SURFACE k = −7.91050e+000  A4 = 3.14150e−005
A6 = −2.10237e−007  A8 = 2.36593e−009
A10 = 1.93470e−011

Unit mm

OTHER DATA
ZOOM RATIO 17.98

| | | | | | | |
|---|---|---|---|---|---|---|
| FOCAL LENGTH | 4.23 | 22.74 | 75.98 | 7.78 | 42.57 | 6.06 |
| F-NUMBER | 1.66 | 2.34 | 2.88 | 1.81 | 2.65 | 1.72 |
| ANGLE OF VIEW | 35.63 | 7.59 | 2.28 | 21.28 | 4.07 | 26.57 |
| IMAGE HEIGHT | 3.03 | 3.03 | 3.03 | 3.03 | 3.03 | 3.03 |
| ENTIRE LENS LENGTH | 152.90 | 152.90 | 152.90 | 152.90 | 152.90 | 152.90 |
| BF | 22.85 | 26.38 | 23.45 | 24.28 | 26.21 | 23.69 |
| d8 | 0.86 | 35.32 | 46.81 | 16.94 | 42.22 | 10.97 |
| d16 | 48.52 | 14.06 | 2.57 | 32.44 | 7.17 | 38.41 |
| d27 | 12.17 | 8.63 | 11.56 | 10.74 | 8.81 | 11.33 |
| d32 | 5.83 | 9.37 | 6.44 | 7.26 | 9.19 | 6.67 |

DATA OF LENS UNITS

| LENS UNIT | MOST-OBJECT-SIDE SURFACE | FOCAL LENGTH |
|---|---|---|
| 1 | 1 | 66.56 |
| 2 | 9 | −11.13 |
| 3 | 17 | 98.38 |
| 4 | 28 | 25.80 |
| 5 | 33 | ∞ |

Numerical Example 5

Unit mm

SURFACE DATA

| SURFACE NUMBER | r | d | nd | vd |
|---|---|---|---|---|
| 1 | 279.602 | 3.20 | 1.84666 | 23.9 |
| 2 | 78.619 | 1.80 | | |
| 3 | 103.422 | 7.85 | 1.59319 | 67.9 |
| 4 | −481.133 | 0.20 | | |
| 5 | 58.971 | 8.60 | 1.49700 | 81.5 |
| 6 | 500.860 | 0.20 | | |
| 7 | 54.232 | 4.55 | 1.83481 | 42.7 |
| 8 | 110.949 | (VARIABLE) | | |
| 9 | 68.002 | 1.15 | 2.00069 | 25.5 |
| 10 | 10.980 | 3.85 | | |
| 11 | 125.053 | 1.00 | 1.85135 | 40.1 |
| 12* | 29.719 | 2.67 | | |
| 13 | −26.734 | 0.85 | 1.77250 | 49.6 |
| 14 | 41.825 | 0.84 | | |
| 15 | 31.046 | 3.10 | 1.94595 | 18.0 |
| 16 | −54.861 | (VARIABLE) | | |
| 17 (APERTURE STOP) | ∞ | 2.73 | | |
| 18 | 89.460 | 0.80 | 1.88300 | 40.8 |
| 19 | 15.461 | 4.20 | 1.84666 | 23.9 |
| 20 | −25.269 | 0.14 | | |
| 21 | −22.185 | 0.80 | 2.00330 | 28.3 |
| 22 | 66.393 | 4.75 | | |
| 23* | 46.529 | 3.60 | 1.58313 | 59.4 |
| 24* | −26.933 | 0.20 | | |
| 25 | −203.745 | 2.00 | 1.48749 | 70.2 |
| 26 | −34.732 | 0.80 | 1.80518 | 25.4 |
| 27 | −229.502 | (VARIABLE) | | |
| 28* | 30.580 | 3.60 | 1.58313 | 59.4 |
| 29* | −48.480 | 0.20 | | |
| 30 | 90.028 | 0.90 | 1.92286 | 18.9 |
| 31 | 28.776 | 3.50 | 1.51633 | 64.1 |
| 32 | −37.052 | (VARIABLE) | | |
| 33 | ∞ | 0.80 | 1.52420 | 60.0 |
| 34 | ∞ | 2.43 | 1.54400 | 70.0 |
| 35 | ∞ | 1.50 | | |

-continued

| Unit mm | | | | |
|---|---|---|---|---|
| 36 | ∞ | 20.00 | 1.58913 | 61.1 |
| 37 | ∞ | 0.50 | 1.49831 | 65.1 |
| 38 | ∞ | 0.5 | | |
| IMAGE PLANE | ∞ | | | |

ASPHERIC SURFACE DATA

12th SURFACE k = −2.09315e+001    A4 = 1.06195e−004
A6 = −8.10904e−007   A8 = 7.60130e−009
A10 = 3.21857e−012   A12 = −2.83689e−013

23rd SURFACE k = 2.10328e+000     A3 = 2.06948e−005
A5 = −1.91231e−006   A7 = −8.07340e−010
A9 = 1.89205e−010    A11 = −1.20487e−012

24th SURFACE k = −4.75167e+000    A3 = 8.42353e−007
A5 = −3.97374e−006   A7 = 2.93971e−008
A9 = −1.04352e−010

28th SURFACE k = 9.42037e−002     A4 = 1.84021e−005
A6 = −2.55342e−007   A8 = 3.04586e−009
A10 = 1.12969e−011

29th SURFACE k = −6.51874e+000    A4 = 3.09390e−005
A6 = −2.38880e−007   A8 = 3.19270e−009
A10 = 1.17773e−011

OTHER DATA
ZOOM RATIO 17.91

| | | | | | | |
|---|---|---|---|---|---|---|
| FOCAL LENGTH | 4.23 | 22.82 | 75.72 | 7.78 | 42.69 | 6.06 |
| F-NUMBER | 1.66 | 2.34 | 2.88 | 1.81 | 2.65 | 1.72 |
| ANGLE OF VIEW | 35.63 | 7.56 | 2.29 | 21.26 | 4.06 | 26.55 |
| IMAGE HEIGHT | 3.03 | 3.03 | 3.03 | 3.03 | 3.03 | 3.03 |
| ENTIRE LENS LENGTH | 152.79 | 152.79 | 152.79 | 152.79 | 152.79 | 152.79 |
| BF | 22.93 | 26.58 | 23.76 | 24.39 | 26.46 | 23.79 |
| d8 | 0.86 | 35.06 | 46.46 | 16.82 | 41.90 | 10.89 |
| d16 | 48.35 | 14.15 | 2.75 | 32.39 | 7.31 | 38.31 |
| d27 | 12.58 | 8.93 | 11.75 | 11.12 | 9.05 | 11.73 |
| d32 | 5.91 | 9.57 | 6.75 | 7.37 | 9.45 | 6.77 |

DATA OF LENS UNITS

| LENS UNIT | MOST-OBJECT-SIDE SURFACE | FOCAL LENGTH |
|---|---|---|
| 1 | 1 | 66.58 |
| 2 | 9 | −10.95 |
| 3 | 17 | 103.50 |
| 4 | 28 | 25.47 |
| 5 | 33 | ∞ |

Numerical Example 6

| Unit mm | | | | |
|---|---|---|---|---|
| SURFACE DATA | | | | |
| SURFACE NUMBER | r | d | nd | vd |
| 1 | 307.127 | 3.20 | 1.84666 | 23.9 |
| 2 | 80.730 | 1.62 | | |
| 3 | 103.464 | 7.87 | 1.59319 | 67.9 |
| 4 | −418.544 | 0.20 | | |
| 5 | 59.873 | 8.61 | 1.49700 | 81.5 |
| 6 | 461.724 | 0.20 | | |
| 7 | 53.960 | 4.55 | 1.83481 | 42.7 |
| 8 | 108.675 | (VARIABLE) | | |
| 9 | 67.704 | 1.15 | 2.00069 | 25.5 |
| 10 | 10.773 | 3.90 | | |
| 11 | 118.914 | 1.00 | 1.86400 | 40.6 |
| 12* | 30.368 | 2.35 | | |
| 13 | −29.183 | 0.85 | 1.77250 | 49.6 |
| 14 | 34.470 | 0.82 | | |
| 15 | 28.050 | 3.10 | 1.94595 | 18.0 |
| 16 | −59.267 | (VARIABLE) | | |
| 17 (APERTURE STOP) | ∞ | 2.73 | | |
| 18 | 90.514 | 0.80 | 1.88300 | 40.8 |
| 19 | 19.387 | 4.20 | 1.84666 | 23.9 |
| 20 | −15.123 | 0.80 | 2.00330 | 28.3 |
| 21 | 66.532 | 4.75 | | |
| 22* | 46.280 | 3.60 | 1.58313 | 59.4 |
| 23* | −26.723 | 0.20 | | |
| 24 | −196.513 | 2.00 | 1.48749 | 70.2 |
| 25 | −34.768 | 0.80 | 1.80518 | 25.4 |
| 26 | −243.969 | (VARIABLE) | | |
| 27* | 30.593 | 3.60 | 1.58313 | 59.4 |
| 28* | −49.603 | 0.20 | | |
| 29 | 90.903 | 0.90 | 1.92286 | 18.9 |
| 30 | 28.594 | 3.50 | 1.51633 | 64.1 |
| 31 | −37.301 | (VARIABLE) | | |
| 32 | ∞ | 0.80 | 1.52420 | 60.0 |
| 33 | ∞ | 2.43 | 1.54400 | 70.0 |
| 34 | ∞ | 1.50 | | |
| 35 | ∞ | 20.00 | 1.58913 | 61.1 |
| 36 | ∞ | 0.50 | 1.49831 | 65.1 |
| 37 | ∞ | 0.5 | | |
| IMAGE PLANE | ∞ | | | |

ASPHERIC SURFACE DATA

12th SURFACE k = −1.17018e+001    A4 = 5.69177e−005
A6 = −1.25418e−007   A8 = 1.94051e−009
A10 = −4.76668e−012  A12 = 7.87486e−014

22nd SURFACE k = 4.27644e+000     A3 = 2.58441e−005
A5 = −2.30847e−006   A7 = −2.27160e−009
A9 = 1.69565e−010    A11 = −1.00008e−012

23rd SURFACE k = −5.05413e+000    A3 = 8.16476e−006
A5 = −3.93873e−006   A7 = 2.47640e−008
A9 = −8.25429e−011

27th SURFACE k = −1.66915e−001    A4 = 2.04977e−005
A6 = −2.14663e−007   A8 = 1.90469e−009
A10 = 2.10665e−011

28th SURFACE k = −7.57115e+000    A4 = 3.00478e−005
A6 = −2.02311e−007   A8 = 2.17514e−009
A10 = 2.12527e−011

OTHER DATA
ZOOM RATIO 19.98

| | | | | | | |
|---|---|---|---|---|---|---|
| FOCAL LENGTH | 4.23 | 23.73 | 84.44 | 7.86 | 45.63 | 6.09 |
| F-NUMBER | 1.66 | 2.34 | 2.88 | 1.81 | 2.65 | 1.72 |
| ANGLE OF VIEW | 35.62 | 7.28 | 2.05 | 21.07 | 3.80 | 26.43 |
| IMAGE HEIGHT | 3.03 | 3.03 | 3.03 | 3.03 | 3.03 | 3.03 |
| ENTIRE LENS LENGTH | 152.92 | 152.92 | 152.92 | 152.92 | 152.92 | 152.92 |
| BF | 22.51 | 26.31 | 22.69 | 24.03 | 26.07 | 23.40 |

-continued

| Unit mm | | | | | | |
|---|---|---|---|---|---|---|
| d8 | 0.89 | 35.83 | 47.47 | 17.19 | 42.81 | 11.14 |
| d16 | 49.06 | 14.12 | 2.48 | 32.76 | 7.14 | 38.81 |
| d26 | 12.95 | 9.15 | 12.77 | 11.43 | 9.39 | 12.06 |
| d31 | 5.49 | 9.29 | 5.67 | 7.01 | 9.05 | 6.38 |

DATA OF LENS UNITS

| LENS UNIT | MOST-OBJECT-SIDE SURFACE | FOCAL LENGTH |
|---|---|---|
| 1 | 1 | 67.08 |
| 2 | 9 | −10.88 |
| 3 | 17 | 91.54 |
| 4 | 27 | 25.80 |
| 5 | 32 | ∞ |

TABLE 1

| | | NUMERICAL EXAMPLE | | | | | |
|---|---|---|---|---|---|---|---|
| CONDITIONS | | 1 | 2 | 3 | 4 | 5 | 6 |
| | fw | 4.10 | 4.23 | 4.23 | 4.23 | 4.23 | 4.23 |
| | ft | 72.53 | 84.42 | 84.49 | 75.98 | 75.72 | 84.44 |
| | f1 | 66.28 | 66.86 | 64.59 | 66.56 | 66.58 | 67.08 |
| | f2 | −10.96 | −10.93 | −10.40 | −11.13 | −10.95 | −10.88 |
| (1) | $\|f2\|/\sqrt{(fw \cdot ft)}$ | 0.64 | 0.58 | 0.55 | 0.62 | 0.61 | 0.58 |
| (2) | N2N | 2.0007 | 2.0007 | 2.0007 | 2.0033 | 2.0007 | 2.0007 |
| (3) | V2P | 17.98 | 17.98 | 17.98 | 20.88 | 17.98 | 17.98 |
| (4) | f1/ft | 0.91 | 0.79 | 0.76 | 0.88 | 0.88 | 0.79 |
| (5) | V1A | 67.90 | 67.90 | 67.90 | 71.30 | 67.90 | 67.90 |
| (6) | V1B | 81.54 | 81.54 | 81.54 | 70.23 | 81.54 | 81.54 |

Next, description will be made of a video camera equipped with the zoom lens of any one of Embodiments 1-6 as an image-taking optical system with reference to FIG. 13.

Reference numeral 10 denotes a main body of the video camera. Reference numeral 11 denotes the image-taking optical system constituted by the zoom lens of any one of Embodiments 1-6. Reference numeral 12 denotes a solid-state image-pickup element (photoelectric conversion element) such as a CCD sensor or a CMOS sensor which receives and photoelectrically converts an object image formed by the image-taking optical system 11.

Reference numeral 13 denotes a memory which stores image data corresponding to the object image photoelectrically converted by the image-pickup element 12. Reference numeral 14 denotes an electric viewfinder allowing a user to observe the image data displayed on a display element (not shown).

Such use of the zoom lens of any one of Embodiments 1-6 for an image pickup apparatus such as the above-described video camera enables miniaturization of the image pickup apparatus and provision of high optical performance to the image pickup apparatus.

The zoom lenses of Embodiments 1-6 can be also applied to a film or digital still camera, a TV camera and a monitoring camera as well.

Furthermore, the present invention is not limited to these embodiments and various variations and modifications may be made without departing from the scope of the present invention.

This application claims the benefit of Japanese Patent Application No. 2009-089942, filed on Apr. 2, 2009, which is hereby incorporated by reference herein in its entirety.

What is claimed is:

1. A zoom lens comprising in order from an object side to an image side:
   a first lens unit having a positive refractive power;
   a second lens unit having a negative refractive power;
   a third lens unit having a positive refractive power; and
   a fourth lens unit having a positive refractive power,
   wherein the second and fourth lens units are moved on an optical axis for zooming,
   wherein the second lens unit is constituted by, in order from the object side to the image side, three negative lens elements and one positive lens element, and
   wherein the following condition is satisfied:

$$0.54 < |f2|/\sqrt{(fw \cdot ft)} < 0.66$$

where f2 represents a focal length of the second lens unit, fw represents a focal length of the entire zoom lens at a wide-angle end, and ft represents a focal length of the entire zoom lens at a telephoto end.

2. A zoom lens according to claim 1, wherein the following conditions are satisfied:

$$1.85 < N2N$$

$$v2P < 22$$

where N2N represents a refractive index of a material of one of the three negative lens elements in the second lens unit, and v2P represents an Abbe constant of a material of the one positive lens element in the second lens unit.

3. A zoom lens according to claim 1, wherein the first lens unit is constituted by, in order from the object side to the image side, a negative lens element, a positive lens element, a positive lens element and a positive lens element, and
   wherein the following conditions are satisfied:

$$0.7 < f1/ft < 1.0$$

$$65 < v1A < 75$$

$$70 < v1B$$

where f1 represents a focal length of the first lens unit, and v1A and v1B respectively represent Abbe constants of materials of one and another of the positive lens elements in the first lens unit.

4. A zoom lens according to claim 1, wherein the fourth lens unit includes a positive lens element disposed on the object side and a cemented lens element disposed on the image side further than the positive lens element, the cemented lens element being formed by cementing a negative lens element and a positive lens element.

5. A zoom lens according to claim 1, wherein at least part of the third lens unit is moved such that a movement direction thereof includes a component orthogonal to the optical axis to shift an image-forming position in a direction orthogonal to the optical axis.

6. An image pickup apparatus comprising:
   a zoom lens including in order from an object side to an image side:
   a first lens unit having a positive refractive power;
   a second lens unit having a negative refractive power;
   a third lens unit having a positive refractive power; and
   a fourth lens unit having a positive refractive power,
   wherein the second and fourth lens units are moved on an optical axis for zooming,
   wherein the second lens unit is constituted by, in order from the object side to the image side, three negative lens elements and one positive lens element, and wherein the following condition is satisfied:

$$0.54 < |f2|/\sqrt{(fw \cdot ft)} < 0.66$$

where f2 represents a focal length of the second lens unit, fw represents a focal length of the entire zoom lens at a wide-angle end, and ft represents a focal length of the entire zoom lens at a telephoto end; and an image pickup element configured to photoelectrically convert an optical image formed by the zoom lens.

* * * * *